(12) United States Patent
Shpunt et al.

(10) Patent No.: US 10,739,460 B2
(45) Date of Patent: Aug. 11, 2020

(54) TIME-OF-FLIGHT DETECTOR WITH SINGLE-AXIS SCAN

(71) Applicant: Apple Inc., Cupertino, CA (US)

(72) Inventors: Alexander Shpunt, Portola Valley, CA (US); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 526 days.

(21) Appl. No.: 15/451,431

(22) Filed: Mar. 7, 2017

(65) Prior Publication Data

US 2017/0176596 A1 Jun. 22, 2017

Related U.S. Application Data

(63) Continuation-in-part of application No. 14/749,654, filed on Jun. 25, 2015, now Pat. No. 9,677,878, which
(Continued)

(51) Int. Cl.
*G01S 17/89* (2020.01)
*G01S 17/42* (2006.01)
(Continued)

(52) U.S. Cl.
CPC ............ *G01S 17/89* (2013.01); *G01C 15/002* (2013.01); *G01S 7/4816* (2013.01); *G01S 7/4817* (2013.01);
(Continued)

(58) Field of Classification Search
None
See application file for complete search history.

(56) References Cited

U.S. PATENT DOCUMENTS 5,225,876 A * 7/1993 Lux ..................... G01S 7/4817
356/2
5,258,822 A 11/1993 Nakamura
(Continued)

FOREIGN PATENT DOCUMENTS

EP 0603003 A1 6/1994
EP 1903304 A2 3/2008
(Continued)

OTHER PUBLICATIONS

International Application # PCT/US2017/039162 Search Report dated Nov. 27, 2017.
(Continued)

*Primary Examiner* — Luke D Ratcliffe
(74) *Attorney, Agent, or Firm* — Kligler & Associates Patent Attorneys Ltd (57) ABSTRACT

Apparatus for mapping includes an illumination assembly, which projects a line of radiation extending in a first direction across a scene. A detection assembly receives the radiation reflected from the scene within a sensing area that contains at least a part of the line of the radiation, and includes a linear array of detector elements and objective optics, which focus the reflected radiation from the sensing area onto the linear array. A scanning mirror scans the line of radiation and the sensing area together over the scene in a second direction, which is perpendicular to the first direction. Processing circuitry processes signals output by the detector elements in response to the received radiation in order to construct a three-dimensional (3D) map of an object in the scene.

20 Claims, 5 Drawing Sheets

Related U.S. Application Data is a continuation of application No. 13/810,451, filed as application No. PCT/IB2011/053560 on Aug. 10, 2011, now Pat. No. 9,098,931.

(60) Provisional application No. 62/319,810, filed on Apr. 8, 2016, provisional application No. 61/425,788, filed on Dec. 22, 2010, provisional application No. 61/372,729, filed on Aug. 11, 2010, provisional application No. 62/353,581, filed on Jun. 23, 2016.

(51) Int. Cl.
*G01S 7/481* (2006.01)
*G01C 15/00* (2006.01)
*G06T 17/00* (2006.01)
*G01B 11/25* (2006.01)

(52) U.S. Cl.
CPC .............. *G01S 17/42* (2013.01); *G06T 17/00* (2013.01); *G01B 11/2518* (2013.01)

(56) References Cited

U.S. PATENT DOCUMENTS

| | | | |
|---|---|---|---|
| 7,248,344 B2 | 7/2007 | Morcom | |
| 7,583,364 B1* | 9/2009 | Mayor | G01N 21/538 |
| | | | 356/4.01 |
| 7,952,781 B2 | 5/2011 | Weiss et al. | |
| 8,018,579 B1 | 9/2011 | Krah | |
| 8,353,457 B2 | 1/2013 | Olmstead | |
| 8,508,676 B2 | 8/2013 | Silverstein et al. | |
| 9,098,931 B2 | 8/2015 | Shpunt et al. | |
| 9,117,712 B1* | 8/2015 | Oggier | H01L 27/14609 |
| 9,267,787 B2 | 2/2016 | Shpunt et al. | |
| 2002/0071169 A1 | 6/2002 | Bowers et al. | |
| 2003/0090646 A1* | 5/2003 | Riegl | G01C 15/002 |
| | | | 356/3 |
| 2003/0090818 A1 | 5/2003 | Wittenberger | |
| 2003/0148391 A1* | 8/2003 | Salafsky | B82Y 30/00 |
| | | | 435/7.2 |
| 2003/0227614 A1 | 12/2003 | Taminiau et al. | |
| 2004/0213463 A1* | 10/2004 | Morrison | G01B 11/25 |
| | | | 382/210 |
| 2005/0024701 A1 | 2/2005 | Cannon et al. | |
| 2005/0110157 A1 | 5/2005 | Sherrer et al. | |
| 2007/0221826 A1 | 9/2007 | Bechtel et al. | |
| 2007/0279722 A1 | 12/2007 | Yavid et al. | |
| 2008/0075325 A1 | 3/2008 | Otani et al. | |
| 2008/0278566 A1 | 11/2008 | Towner et al. | |
| 2009/0141192 A1 | 6/2009 | Nojima | |
| 2010/0053595 A1 | 3/2010 | Lee | |
| 2010/0142020 A1 | 6/2010 | Kim | |
| 2011/0019176 A1 | 1/2011 | Kim | |
| 2011/0122101 A1* | 5/2011 | Kurozuka | G02B 26/101 |
| | | | 345/204 |
| 2011/0188054 A1 | 8/2011 | Petronius et al. | |
| 2011/0228251 A1 | 9/2011 | Yee et al. | |
| 2011/0254928 A1 | 10/2011 | Meinherz | |
| 2011/0279648 A1 | 11/2011 | Lutian et al. | |
| 2011/0310125 A1 | 12/2011 | McEldowney et al. | |
| 2012/0074296 A1 | 3/2012 | Hammes et al. | |
| 2012/0182392 A1 | 7/2012 | Kearns et al. | |
| 2012/0236379 A1 | 9/2012 | Da Silva et al. | |
| 2013/0207970 A1 | 8/2013 | Shpunt et al. | |
| 2013/0250387 A1 | 9/2013 | Chayat et al. | |
| 2014/0168633 A1 | 6/2014 | Guetta et al. | |
| 2014/0225824 A1 | 8/2014 | Shpunt et al. | |
| 2014/0291496 A1 | 10/2014 | Shpunt et al. | |
| 2014/0320944 A1 | 10/2014 | Lubianiker et al. | |
| 2015/0120057 A1 | 4/2015 | Wong et al. | |
| 2015/0198801 A1 | 7/2015 | Naono | |
| 2015/0260506 A1 | 9/2015 | Bridges | |
| 2016/0282468 A1 | 9/2016 | Gruver et al. | |

FOREIGN PATENT DOCUMENTS

| | | |
|---|---|---|
| JP | H07198845 A | 8/1995 |
| KR | 1020120091810 A | 8/2012 |
| WO | 8702148 A1 | 4/1987 |
| WO | 9816801 A1 | 4/1998 |
| WO | 0020825 A1 | 4/2000 |
| WO | 02/082016 A1 | 10/2002 |
| WO | 2004036245 A2 | 4/2004 |
| WO | 2012150590 A1 | 11/2012 |

OTHER PUBLICATIONS

Sick AG, "MiniFaros: Low-cost Miniature Laserscanner for Environment Perception", Presentation at 15th International Forum on Advanced Microsystems for Automotive Applications (AMAA 2011), 17 pages, Berlin, Germany, 2011.
U.S. Appl. No. 15/586,295 office action dated Sep. 19, 2018.
International Application # PCT/US2017/021018 Search Report dated Jun. 12, 2017.

* cited by examiner

TIME-OF-FLIGHT DETECTOR WITH SINGLE-AXIS SCAN

CROSS-REFERENCE TO RELATED APPLICATION

This application claims the benefit of U.S. Provisional Patent Application 62/319,810, filed Apr. 8, 2016, and of U.S. Provisional Patent Application 62/353,581, filed Jun. 23, 2016. This application is also a continuation-in-part of U.S. patent application Ser. No. 14/749,654, filed Jun. 25, 2015, which is a continuation of U.S. patent application Ser. No. 13/810,451, filed Jan. 16, 2013 (now U.S. Pat. No. 9,098,931), in the national phase of PCT Patent Application PCT/IB2011/053560, filed Aug. 10, 2011, which claims the benefit of U.S. Provisional Patent Application 61/372,729, filed Aug. 11, 2010, and U.S. Provisional Patent Application 61/425,788, filed Dec. 22, 2010. All of these related applications are incorporated herein by reference.

FIELD OF THE INVENTION

The present invention relates generally to three-dimensional (3D) mapping, and particularly to devices and methods for 3D mapping based on projection and sensing of a beam of radiation.

BACKGROUND

Various methods are known in the art for optical 3D mapping, i.e., generating a 3D profile of the surface of an object by processing optical radiation received from the object. This sort of 3D profile is also referred to as a 3D map, depth map or depth image, and 3D mapping is also referred to as depth mapping. "Optical radiation" includes any and all electromagnetic radiation in the visible, infrared and ultraviolet portions of the spectrum. In the description that follows, the term "radiation" should be understood as referring to optical radiation.

Some 3D mapping techniques are based on measurement of the time of flight of optical pulses. For example, U.S. Patent Application Publication 2013/0207970, whose disclosure is incorporated herein by reference, describes a scanning depth engine, in which mapping apparatus includes a transmitter, which emits a beam comprising pulses of light, and a scanner, which is configured to scan the beam, within a predefined scan range, over a scene. A receiver receives the light reflected from the scene and generates an output indicative of a time of flight of the pulses to and from points in the scene. A processor is coupled to control the scanner so as to cause the beam to scan over a selected window within the scan range and to process the output of the receiver so as to generate a 3D map of a part of the scene that is within the selected window.

SUMMARY

Embodiments of the present invention that are described hereinbelow provide improved devices and methods for 3D mapping.

There is therefore provided, in accordance with an embodiment of the invention, apparatus for mapping, including an illumination assembly, which is configured to project a line of radiation extending in a first direction across a scene. A detection assembly is configured to receive the radiation reflected from the scene within a sensing area that contains at least a part of the line of the radiation, and includes a linear array of detector elements and objective optics, which focus the reflected radiation from the sensing area onto the linear array. A scanning mirror is configured to scan the line of radiation and the sensing area together over the scene in a second direction, which is perpendicular to the first direction. Processing circuitry is configured to process signals output by the detector elements in response to the received radiation in order to construct a three-dimensional (3D) map of an object in the scene.

In the disclosed embodiments, the linear array has an array axis that is aligned along the first direction. In some embodiments, the scanning mirror is configured to rotate about a mirror axis, and the illumination assembly includes at least one radiation source, which is arranged in a plane defined by the array axis and the mirror axis together with the linear array and the scanning mirror.

In one embodiment, the illumination assembly includes a further linear array of radiation sources, which are configured to emit respective beams of radiation, and projection optics which are configured to collect and focus the emitted beams to form the line of the radiation. Typically, the linear arrays of the detector elements and of the radiation sources have respective axes that are mutually parallel.

Alternatively, the scanning mirror is a second scanning mirror, while the illumination assembly includes a radiation source, which is configured to emit a beam of radiation, and a first scanning mirror, which is configured to receive and scan the emitted beam in the first direction. In a disclosed embodiment, the first scanning mirror scans at a first speed, and the second scanning mirror scans at a second speed, which is slower than the first speed.

In some embodiments, the illumination assembly is configured to emit pulses of radiation, and the signals output by the detector elements are indicative of respective times of flight of the pulses from points in the scene, and the processing circuitry is configured to construct the 3D map responsively to the times of flight. In one embodiment, the detector elements include avalanche photodiodes. Alternatively, the detector elements include single-photon avalanche diodes. In a disclosed embodiment, the processing circuitry includes a pulse amplifier, which is configured to amplify the signals output by the detector elements, and a multiplexer, which is configured to select the detector elements for connection to the pulse amplifier in synchronization with a scan rate of the apparatus.

In some embodiments, the scanning mirror is rotatable so as to scan the line of radiation and the sensing area both over a first scene on a first side of the apparatus and over a second scene on a second side of the apparatus, opposite the first side. In a disclosed embodiment, the scanning mirror has first and second opposing reflective surfaces, and the scanning mirror rotates so that the line of radiation and the sensing area reflect from the first reflective surface when scanning over the first scene and from the second reflective surface when scanning over the second scene. In one embodiment, the second reflective surface is smaller than the first reflective surface.

There is also provided, in accordance with an embodiment of the invention, a method for mapping, which includes projecting a line of radiation that extends in a first direction over a scene. The radiation reflected from the scene within a sensing area of a detector assembly is received by the detector assembly, which includes a linear array of detector elements. Using a scanning mirror, both the line of radiation and the sensing area are scanned over the scene in a second direction, which is perpendicular to the first direction. Signals output by the detector elements in response to the received radiation are processed in order to construct a three-dimensional (3D) map of an object in the scene.

In a disclosed embodiment, receiving the radiation includes aligning an array axis of the linear array along the first direction.

In some embodiments, projecting the line of radiation includes applying a linear array of radiation sources to emit respective beams of radiation, and collecting and focusing the emitted beams to form the line of the radiation.

In other embodiments, projecting the line of radiation includes scanning a beam along the line in the first direction. In a disclosed embodiment, scanning the beam includes scanning the beam along the line at a first speed, and scanning using the scanning mirror includes scanning the line of radiation and the sensing area over the scene at a second speed, which is slower than the first speed.

In a disclosed embodiment, scanning the beam of radiation includes scanning pulses of radiation, and the signals output by the detector elements are indicative of respective times of flight of the pulses, and processing the signals includes constructing the 3D map responsively to the times of flight.

The present invention will be more fully understood from the following detailed description of the embodiments thereof, taken together with the drawings in which:

DETAILED DESCRIPTION OF EMBODIMENTS

In some 3D mapping systems based on time-of-flight measurement, such as that described in the above-mentioned U.S. Patent Application Publication 2013/0207970, the same scanning mirror is used to scan both the pulsed beam that is transmitted toward the scene and the sensing area of the detector, which senses the reflected radiation, in both horizontal and vertical directions. This approach is advantageous in ensuring that the transmitted and received beam axes are mutually aligned, but it imposes difficult constraints on the optical design of the system. In other systems, separate mirrors are used to scan the transmitted beam and the sensing area of the detector, thus relaxing the optical constraints but giving rise to possible difficulties in alignment and synchronization of the sensing area with the transmitted beam.

Embodiments of the present invention address these difficulties by projecting a line of radiation and capturing the reflected radiation using a linear array of detectors, with a scanning mirror that scans both the line of radiation and the sensing area of the detectors together over a scene. This approach both simplifies the optical design of the scanning module and obviates mechanical problems associated with rapid scanning, while enabling compact, robust module designs. In some of these embodiments, the scanning mirror can be rotated so as to scan the emitted beams and the sensing area both over a first scene on one side of the apparatus and over a second scene on the opposite side of the apparatus, making it possible to create 3D maps of either or both of these scenes.

In the disclosed embodiments, mapping apparatus comprises an illumination assembly, which projects a line of radiation extending in a certain direction across a scene that is to be mapped, for example in a horizontal direction. In some of the embodiments described below, the illumination assembly comprises a linear array of radiation sources, which emit respective beams of radiation, with projection optics that collect and focus the emitted beams to form the line of radiation. Alternatively, however, the illumination assembly may comprise a single radiation source with suitable optics.

A detection assembly receives the radiation reflected from the scene within a sensing area that contains the projected line of the radiation (or at least a part of the projected line). For this purpose, the detection assembly comprises a linear array of detector elements and objective optics, which focus the reflected radiation from the sensing area onto the linear array. The sensing area is typically long and narrow, parallel to and in alignment with the line of radiation. For this purpose, the axis of the array of detector elements may also be aligned along the same direction as the line of radiation.

A scanning mirror scans the line of radiation and the sensing area together over the scene in a direction that is perpendicular to the line of radiation. Thus, for example, if the illumination assembly projects a horizontal line, the mirror scans the line vertically, or vice versa. This arrangement is advantageous in that the mirror can scan relatively slowly (for example, at 30 Hz to enable mapping at standard video refresh rates), and no high-speed scanning components are required.

Other embodiments of the present invention use a hybrid approach, combining a scanning illumination beam with a fixed array of detector elements for sensing the reflected radiation. A first scanning mirror scans the emitted beam in a first direction over a scene, while a second scanning mirror, as described above, scans both the emitted beam and the sensing area of the detector array over the scene in a second direction, perpendicular to the first direction.

Processing circuitry processes the signals output by the detector elements in response to the received radiation in order to construct a 3D map of an object in the scene. In the embodiments described below, the illumination assembly emits pulses of radiation, and the detector elements output signals that are indicative of respective times of flight of pulses from points in the scene, which are used by the processor in constructing the 3D map. Alternatively, the apparatus and techniques described herein may be applied, mutatis mutandis, in other sorts of 3D mapping systems.

Figure 1:
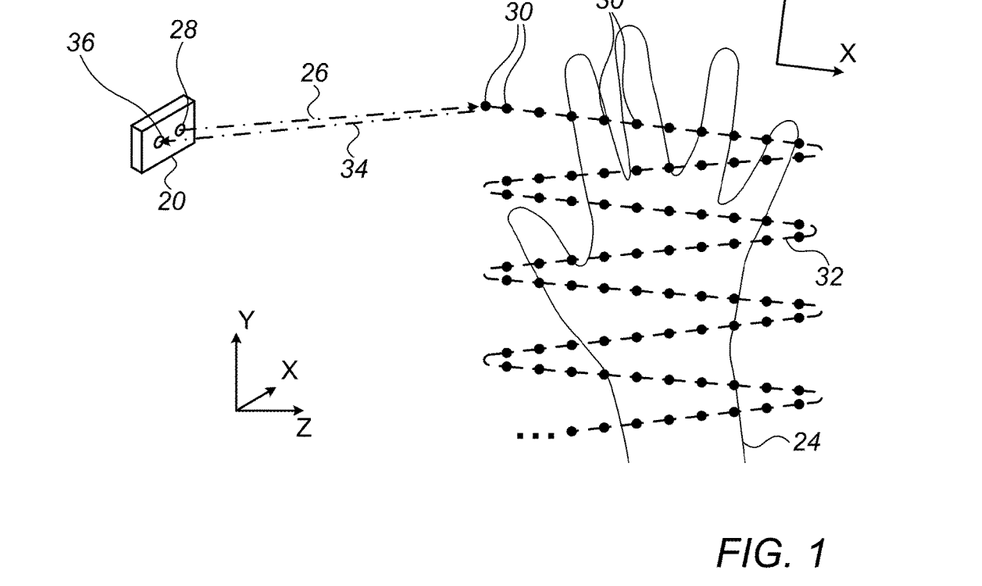
FIG. 1 is a schematic pictorial illustration of a 3D mapping system, in accordance with an embodiment of the invention.

FIG. 1 is a schematic, pictorial illustration of a system for 3D mapping, in accordance with an embodiment of the invention. The system is built around a 3D mapping module 20, which is described in greater detail with reference to the figures that follow. Module 20 may be used, for example, in or together with a computing device for mapping a hand 24 of a user for purposes of gesture detection. This is just one possible, non-limiting application of the present embodiment, and module 20, as well as other sorts of apparatus based on the principles described herein, may similarly be applied in other types of systems and used to map various other types of objects.

Figure 2:
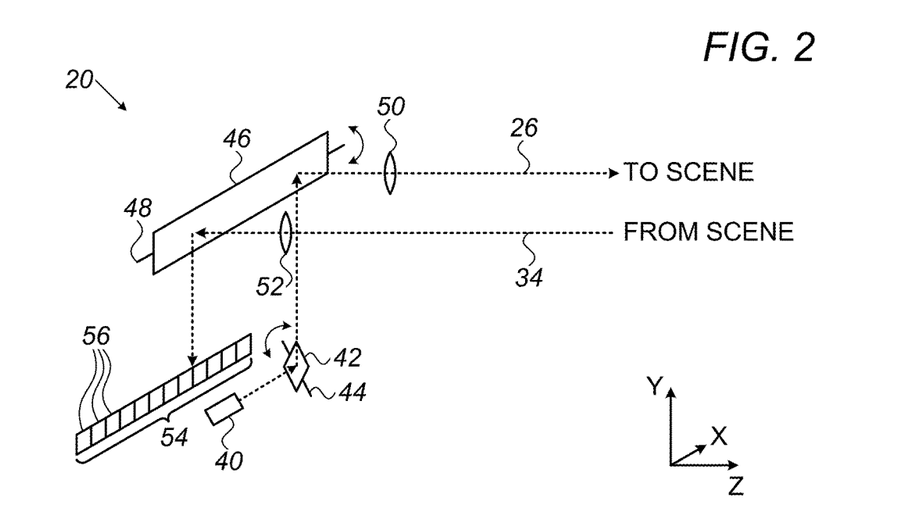
FIG. 2 is a schematic pictorial illustration showing details of a 3D mapping module, in accordance with an embodiment of the invention.

As shown in FIG. 1, module 20 emits a pulsed beam 26 of radiation through an exit aperture 28 toward a scene that includes hand 24. Module 20 scans the beam over the scene in a predefined scan pattern 32, such as a raster scan, which is generated by cooperative operation of two scanning mirrors as shown in FIG. 2. Each pulse emitted from exit aperture 28 illuminates a successive spot 30 in the scene along the scan pattern, and the spots in each row of scan pattern 32 define a projected line of radiation. Radiation 34 that is reflected from the scene at each spot 30 is collected through an entrance aperture 36 of module 20 and detected by a detection assembly in the module, which is likewise shown in the figures that follow. Processing circuitry in or associated with module 20 processes the signals output by the detection assembly in response to the reflected radiation 34 that is received through aperture 36 in order to construct a 3D map of hand 24 and/or other objects in the scene.

For convenience in the description that follows, the frontal plane of module 20 is taken to be the X-Y plane, as illustrated in FIG. 1, while the Z-axis corresponds to the direction of propagation of beam 26 when undeflected, i.e., roughly at the center of scan pattern 32. Module 20 scans beam 26 across an X-Y plane. In pattern 32, the X-axis of the scan is taken to be the "fast" axis, which is traversed by beam 26 many times in the course of each scan over the scene, while the Y-axis is taken to be the "slow" axis. These choices of the axes are arbitrary, however, and module 20 can be configured to generate other scan patterns, with different scan axes, as will be apparent to those skilled in the art after reading the present description.

FIG. 2 is a schematic pictorial illustration showing details of 3D mapping module 20, in accordance with an embodiment of the invention. Mapping module 20 comprises an illumination assembly, comprising a radiation source 40, which emits beam 26, and a scanning mirror 42, which receives and reflects beam 26 from source 40. In a typical implementation, radiation source 40 comprises a laser diode, which emits ultra-short pulses, having a duration on the order of 1 ps. To minimize the size and weight of module 20 and enable high-speed scanning, mirror 42 in this embodiment is typically small (for example, less than 10 mm in diameter). Such mirrors can be made by micro-electromechanical systems (MEMS) techniques, as described, for example, in the above-mentioned U.S. Patent Application Publication 2013/0207970, with an electromagnetic, electrostatic, or piezoelectric drive. Alternatively, mirror 42 may comprise a rotating polygon or any other suitable type of scanning mirror that is known in the art.

In an alternative embodiment (not shown in the figures), multiple radiation sources can share mirror 42, with the sources arranged so that their beams strike the mirror at different angles, thus scanning over different parts of the scene and increasing the pixel throughput of module 20 while decreasing the required mirror scan amplitude.

Mirror 42 rotates about an axis 44, causing beam 26 to scan over the scene in the X-direction. A second mirror 46, which rotates about an axis 48, causes beam 26 to scan over the scene in the Y-direction. Typically, the small, lightweight mirror 42 rotates at high speed, possibly in a resonant scanning mode, while mirror 46 rotates at a slower speed. Mirror 46 may thus comprise a MEMS device or any other suitable sort of rotating mirror.

If the beam output by source 40 is not well collimated, optics 50 may be added in the beam path to improve collimation. Optics 50 may be positioned either where shown in FIG. 2 or at any other suitable location, for example, between source and mirror 42 or between mirror 42 and mirror 46. Additionally or alternatively, optics 50 may be used to enhance the scan range, as described, for example, in the above-mentioned U.S. Pat. No. 9,098,931. Furthermore, the distance between mirrors 42 and 46 is typically smaller than that shown in FIG. 2, with mirror 42 in or near the plane of the entrance pupil of the optical receiver.

Reflected radiation 34 from each of spots 30 is received by a detection assembly, comprising a linear array 54 of detector elements 56 and objective optics 52, which focus the reflected radiation onto the detector elements. Optics 52 typically comprise a multi-element lens with a wide acceptance angle and may be positioned between array 56 and mirror 46, rather than in the position shown in FIG. 2. It is desirable that the entrance pupil of the lens be close to mirror 46 to achieve a compact design. Additionally or alternatively, optics 52 comprise a narrowband filter, which passes the wavelength of source 40 while preventing ambient radiation from reading detector elements 56.

Optics 52 thus define the sensing area of the detection assembly, which is essentially the optical projection by optics 52 of the area of detector elements 56. Mirror 46 scans this sensing area over the scene, including hand 24, in the Y-direction, simultaneously with scan pattern 32 of transmitted beam 26. At least one of detector elements 56 will then capture the radiation reflected from each of spots 30 in the scan pattern. There is thus no need for a collection mirror to scan the sensing area at high speed in the X-direction.

In the pictured embodiment, array 54 comprises a single row of detector elements 56 arranged along an array axis, which in this example is parallel to the X-direction, i.e., parallel to axis 48 of mirror 46. Alternatively, the array may comprise multiple, parallel rows of detector elements arranged in this way. In this geometry, as shown in FIG. 2, it is possible to arrange most of the key elements of module 20, including radiation source 40, mirrors 42 and 46, and array 56, in the X-Y plane that contains both the array axis and mirror axis 48. This planar arrangement of the array elements is useful in achieving a compact design of module 20, with a low profile in the Z-direction, as is shown in FIG. 1.

Figure 3:
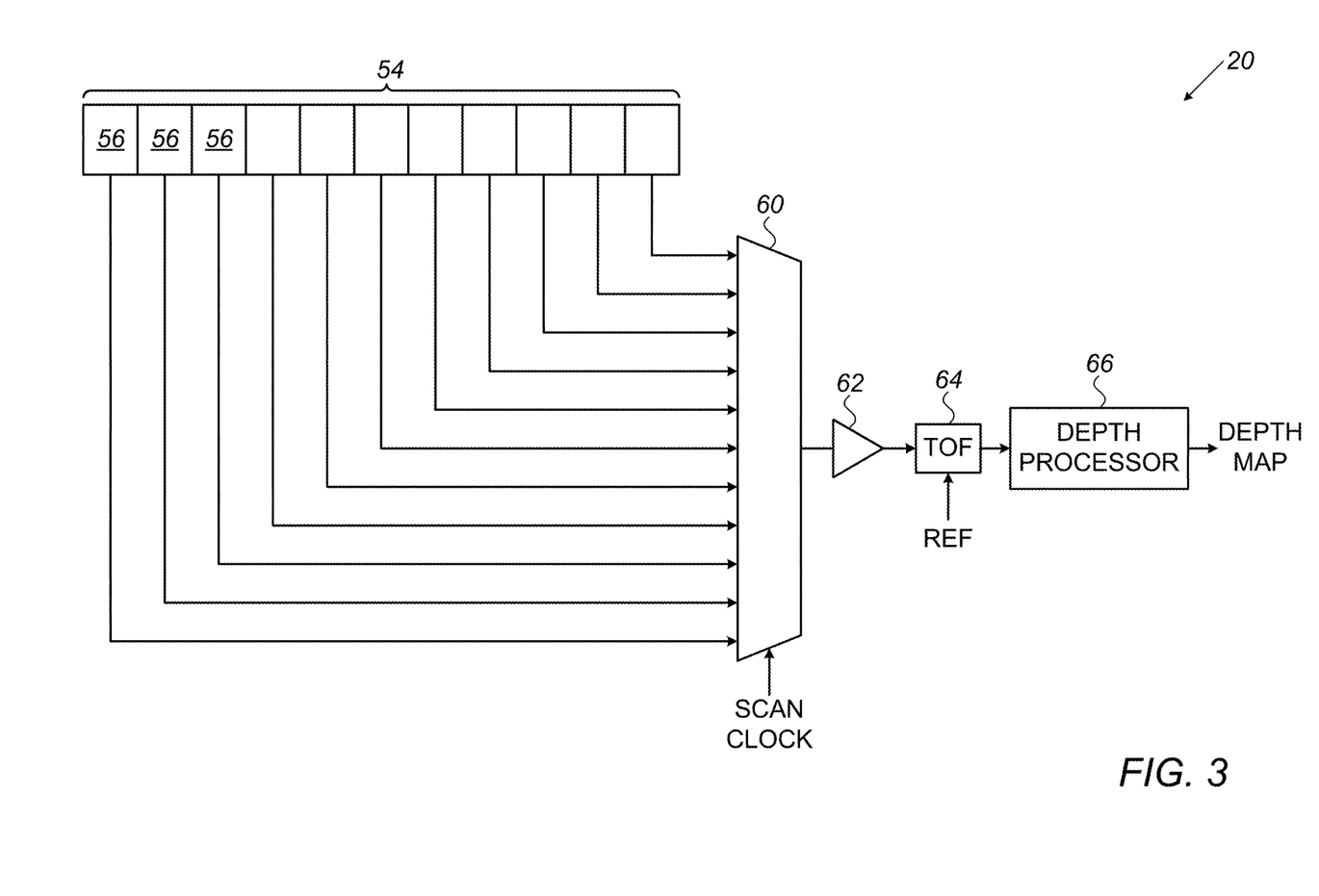
FIG. 3 is a block diagram that schematically shows processing circuitry used in 3D mapping, in accordance with an embodiment of the invention.

FIG. 3 is a block diagram that schematically shows processing circuitry used in or with 3D mapping module 20, in accordance with an embodiment of the invention. This circuitry processes the signals output by detector elements 56 in response to received radiation 34 in order to construct the 3D map of hand 24 (or of other objects in the scene). The signals output by the detector elements are indicative of respective times of flight (TOF) of the pulses emitted by radiation source 40, and the processing circuitry constructs the 3D map by measuring these times of flight.

For this purpose, detector elements 56 typically comprise sensitive, high-speed photodetectors, such as avalanche photodiodes or single-photon avalanche diode (SPAD) devices. When avalanche photodiodes or similar sorts of detectors are used, one or more pulse amplifiers, such as high-speed transimpedance amplifiers (TIAs), amplify the signals output by detector elements 56 in order to generate sharp output pulses for TOF measurement. Although it is possible to couple a respective TIA to each detector element 56, in practice only one detector will actually receive reflected radiation at any given time: the detector whose sensing area is aligned along the X-axis with the current location of transmitted beam 26 and the corresponding spot 30. Therefore, in the pictured embodiment, module 20 comprises only a single pulse amplifier 62, and a multiplexer 60 selects detector elements 56 for connection to pulse amplifier 62 in synchronization with the scan of scanning mirror 42 about axis 44. In other words, at any point during the scan, multiplexer 60 connects the input of amplifier 62 to the output of the detector element 56 that is aligned with transmitted beam 26 at that point.

The pulse output of amplifier 62 is input to a TOF circuit 64, which compares the arrival time of each pulse at detector 56 to a reference signal indicating the time at which the pulse was emitted by transmitter 40 and generates a corresponding delay value. TOF circuit 64 may comprise a time-to-digital converter (TDC), for example. A depth processing circuit 66 collects the TOF values over the entire scan pattern 32 and combines them into a 3D map of the scene begin scanned.

When detector elements 56 comprise SPAD devices, no TIA is needed, and instead event timing histograms are created and analyzed in order to determine the TOF values for each pixel.

Since the beam from transmitter 40 in this embodiment is scanned over the scene, the resolution of module 20 is determined not by the pitch or number of detector elements 56 in array 54, but rather by the accuracy of sensing and angular pointing, along with the pulse frequency. This feature is especially valuable when detector elements 56 comprise APD sensors, since APDs can be bigger than the required pixel size.

Alternatively, other sorts of processing circuitry, including one or multiple pulse amplifiers, may be coupled to the output of detector elements 56. Furthermore, although the disclosed embodiments are directed specifically to TOF-based 3D mapping, the principles of the present invention may similarly be applied in other types of 3D mapping, such as the sort of pattern-based matching that is described in U.S. Pat. No. 9,098,931, as well as other applications of high-speed optical scanners and detectors.

Figure 4:
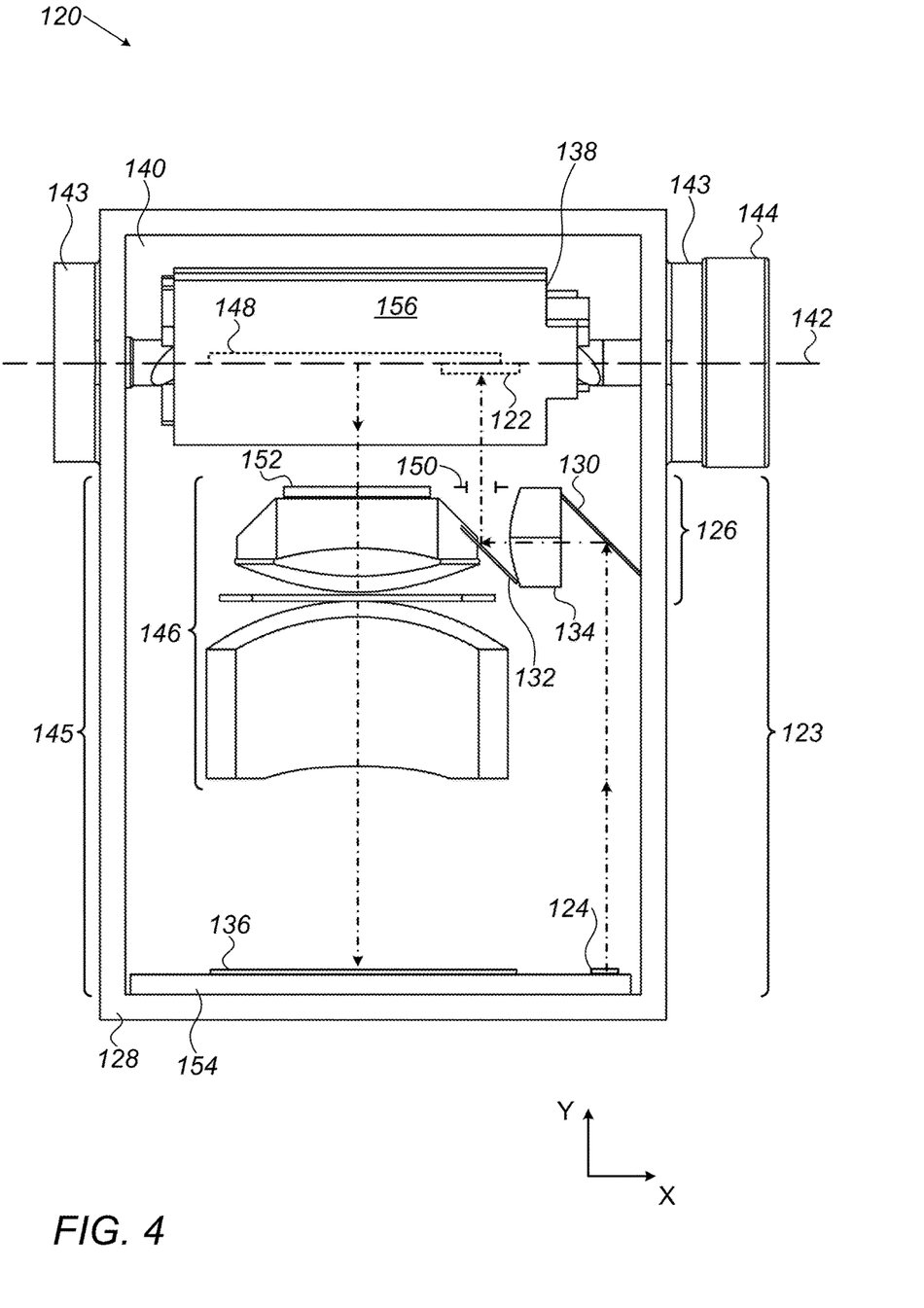
FIG. 4 is a schematic frontal view of a 3D mapping module, in accordance with another embodiment of the invention.
Figure 5:
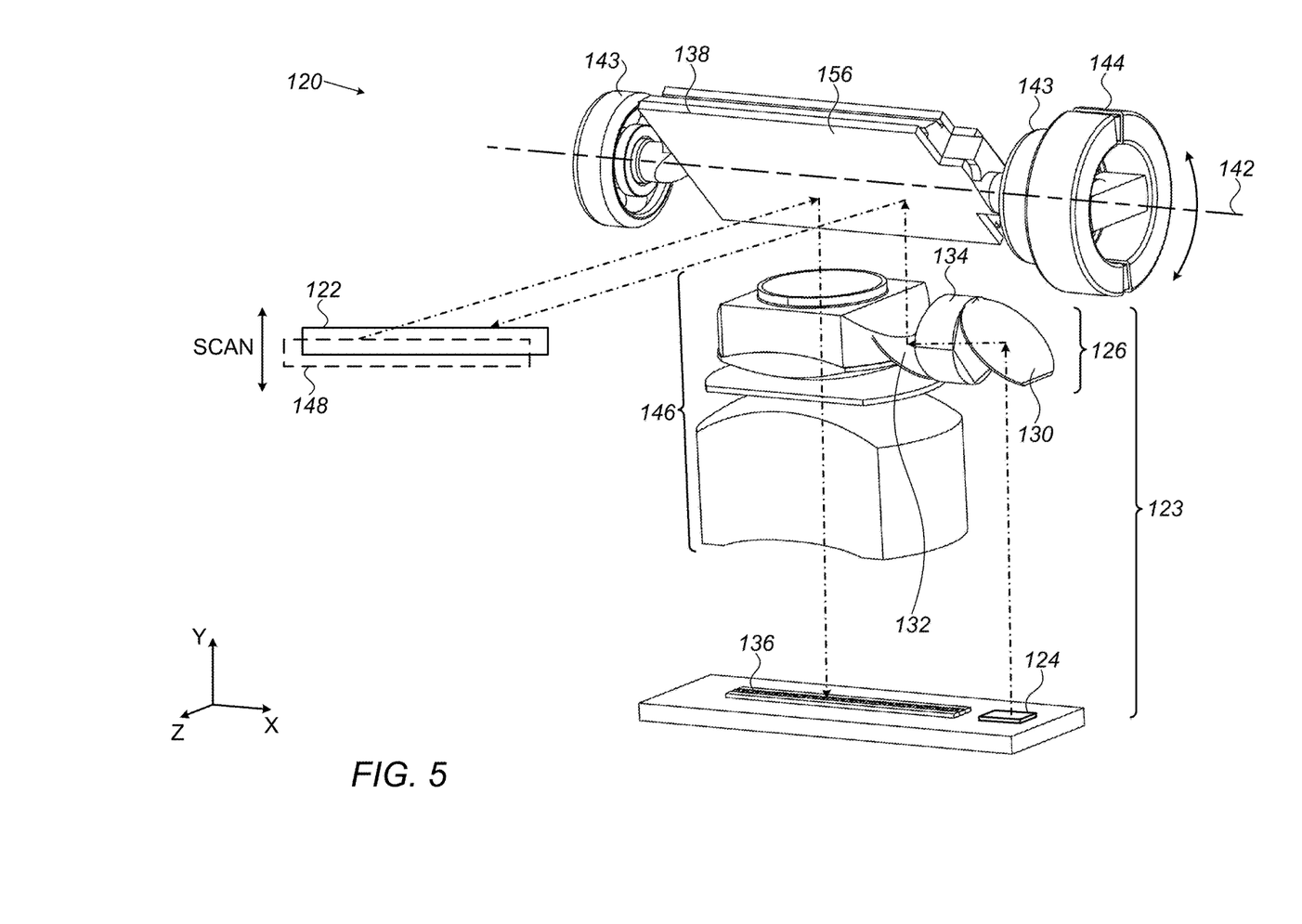
FIG. 5 is a schematic pictorial illustration showing details of the 3D mapping module of FIG. 4, in accordance with an embodiment of the invention.

Reference is now made to FIGS. 4 and 5, which schematically illustrate a 3D mapping module 120, in accordance with another embodiment of the invention. FIG. 4 is a frontal view, while FIG. 5 is a pictorial illustration showing details of the components of the module. For convenience in the description that follows, as in the preceding embodiment, the frontal plane of module 120 is taken to be the X-Y plane, while the Z-axis corresponds to the direction of propagation of a line 122 of radiation emitted from module 120 when undeflected, i.e., roughly at the center of the scan pattern of the module. Line 122 is oriented along the X-direction and is scanned by module 120 in the Y-direction. These choices of the axes are arbitrary, however, and are used solely for the sake of clarity and convenience in the present description.

Mapping module 120 comprises an illumination assembly 123, comprising a linear array 124 of radiation sources, which emit respective beams of radiation, and projection optics 126, which collect and focus the emitted beams to form line 122. (The term "line" is used in this context to mean a long, narrow area that is illuminated by the combined beams from array 124 or, alternatively, by the scanned beam in the preceding embodiment.) In the present embodiment, the axis of array 124 is oriented along the X-axis on the lower surface of a case 128 of module 120; and optics 126 comprise a pair of turning mirrors 130, 132 with a collimating lens 134 between them. (Turning mirrors 130, 132 shift the beam axes into closer proximity with the sensing area of an array 136 of detector elements, as described further hereinbelow.) Alternatively, array 124 may be mounted, for example, on the side of case 128, in which case turning mirror 130 may be eliminated. In a typical implementation, the radiation sources in array 124 comprise laser diodes, which emit ultra-short pulses of infrared radiation in mutual synchronization, having a duration on the order of 1 ps.

A scanning mirror 138 reflects line 122 of radiation that is formed by optics 126 through a window 140 in case 128 toward the scene that is to be mapped. Mirror 138 rotates about a mirror axis 142 that is oriented along the X-direction, thus causing line 122 to scan over the scene in the Y-direction. In the pictured embodiment, mirror 138 is mounted on bearings 143 and is rotated at the desired scan rate by a suitable mechanism 144, such as a motor or magnetic drive. Alternatively, mirror 138 may comprise a MEMS device, as is known in the art, or any other suitable sort of beam deflector.

Mirror 138 also reflects the radiation returned from the scene toward a detection assembly 145, comprising linear array 136 of detector elements and objective optics 146, which focus the reflected radiation from a sensing area 148 within the scene onto array 136. (For enhanced compactness and reduction of undesirable geometric effects, turning mirror 132 may be formed on an oblique surface of one of the lenses in objective optics 146.) Sensing area 148 corresponds to the projection by optics 146 of the area of the detector elements in array 136 onto the scene being mapped. Line 122 and sensing area 148 overlap in the plane of the scene that is being mapped. For good imaging and tracking between line 122 and sensing area 148 in the embodiment shown in the figures, an exit pupil 150 of projection optics 126 and an entrance pupil 152 of objective optics 146 are coplanar and located in close proximity to one another. To minimize the size of module 120 and reduce triangulation effects between the transmitted beams and the sensing areas, it is desirable that the plane of pupils 150 and 152 be located roughly midway between optics 146 and mirror 138, and that the axes of the array of transmitted beams and of the sensing area be collinear in this plane.

In the pictured embodiment, array 136 comprises a single row of detector elements arranged along an array axis, which is likewise parallel to the X-axis, i.e., parallel to axis 142 of mirror 138, as well as to the axes of line 122 and array 124 in this example. Alternatively, array 136 may comprise multiple, parallel rows of detector elements arranged in this way. In this geometry, as shown in the figures, it is possible to arrange most of the key elements of module 120, including arrays 124 and 136 and mirror 138, in the X-Y plane that contains both the array axes and mirror axis 142. This planar arrangement is useful in achieving a compact design of module 120, with a low profile in the Z-direction. Arrays 124 and 136 may conveniently be mounted on a common printed circuit substrate 154, as shown in FIG. 4.

Processing circuitry (such as depth processing circuit 66 or other sorts of processing circuitry described above) used in or with 3D mapping module 120 processes the signals output by the detector elements in array 136 in response to the radiation reflected from sensing area 148, in order to construct a 3D map of an object or objects in the scene. The signals output by the detector elements are indicative of respective times of flight (TOF) of the pulses emitted by the radiation sources in array 124, and the processing circuitry constructs the 3D map based on these times of flight. For this purpose, the detector elements in array 136 typically comprise sensitive, high-speed photodetectors, such as avalanche photodiodes or single-photon avalanche diode (SPAD) devices. The configuration and uses of these detector types in module 120 are similar to those described above with reference to module 20.

As in the preceding embodiment, other sorts of processing circuitry may be coupled to the outputs of the detector elements, and the principles of the present embodiment may similarly be applied in other types of 3D mapping, as well as other applications of high-speed optical scanners and detectors.

Figure 6:
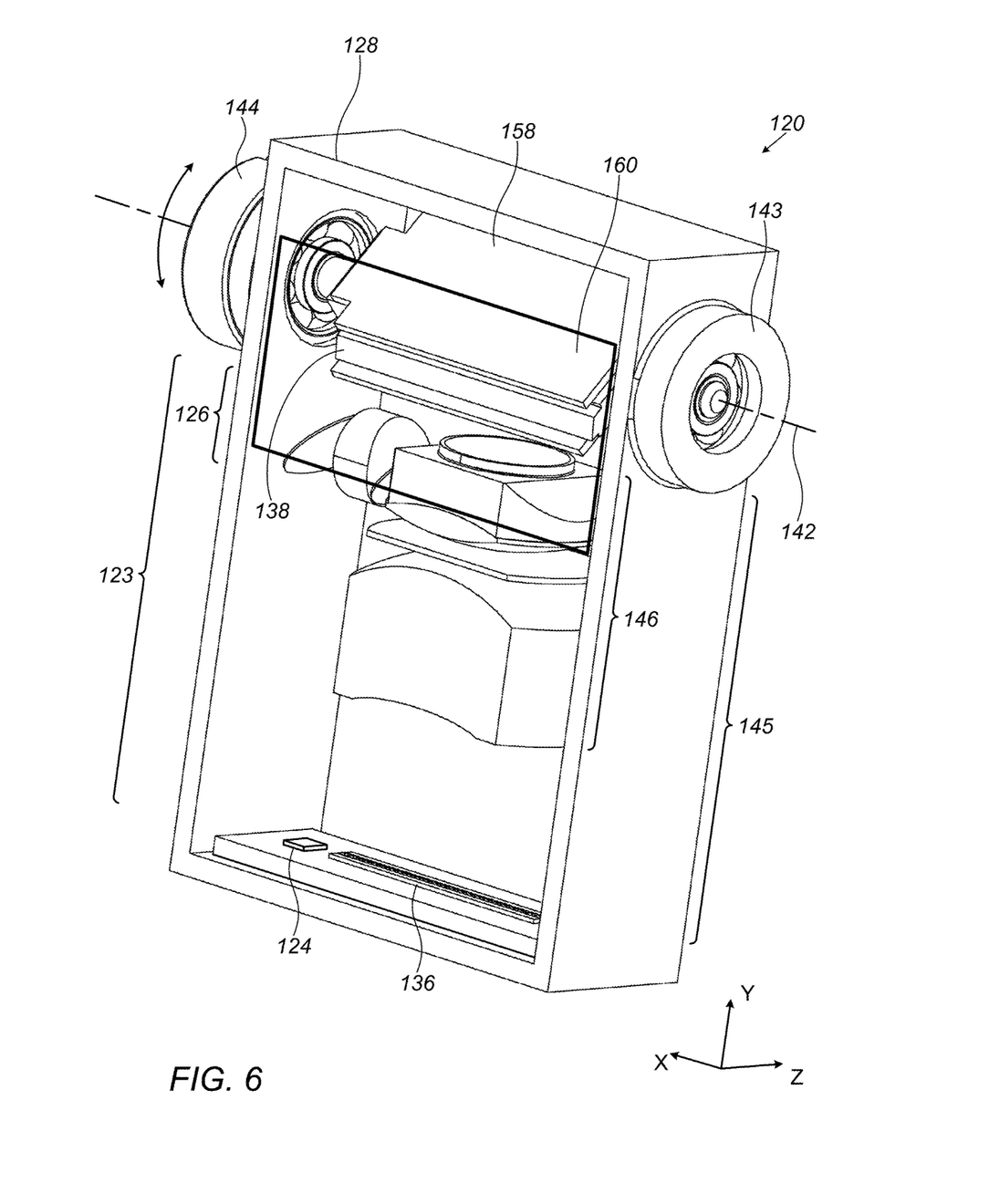
FIG. 6 is a schematic pictorial illustration showing a rear view of the 3D mapping module of FIG. 4, in accordance with an embodiment of the invention.

FIG. 6 is a schematic pictorial illustration showing a rear view of 3D mapping module 120, in accordance with an embodiment of the invention. Scanning mirror 138 is rotatable so as to scan line 122 of radiation and sensing area 148 both over the scene on the front side of module 120 that is shown in FIGS. 4 and 5 and over another scene on the opposite, rear side of module 120, which is shown in FIG. 6. (The terms "front" and "rear" are used arbitrarily, for the sake of clarity, and may just as well be reversed in devices in which module 120 is installed.) The same illumination assembly 123 and detection assembly 145 are used in both front and rear scanning configurations.

To scan the rear side of module 120, it is possible simply to rotate mirror 138 about mirror axis 142 so that the same reflective surface faces the rear side. To make module 120 still more compact, however, in the present embodiment mirror 138 has two opposing reflective surfaces: a front surface 156 that is shown in FIGS. 4 and 5, and a rear surface 158 that is shown in FIG. 6. Mirror 138 rotates about axis 142 so that line 124 and sensing area 148 reflect from front surface 156 when scanning over the scene on the front side of module, and from rear surface 158 when scanning over the scene on the rear side. As a consequence of this structure, mirror 138 need never rotate through the horizontal (X-Z) plane, and module 120 may thus be made very thin, for example less than 5 mm thick in the Z-direction.

To reduce the size of module 120 still further, rear surface 158 can be made smaller than front surface 156, as illustrated in FIG. 6, so that mirror 138 has a profile in the Y-Z plane that is roughly trapezoidal. When mapping the scene on the rear side of module 120, rear surface 158 reflects line 124 and sensing area 148 through a window 160 in the rear side of case 128. The smaller rear surface 158 means that the collection aperture of objective optics 146, and hence the sensitivity of detection assembly 145, are smaller in the rear scanning configuration than in the front scanning configuration. This tradeoff of sensitivity against module size may be acceptable, for example, when the rear scanning configuration is used primarily for nearby scenes, in which the intensity of the radiation reflected back from sensing area 148 is relatively high.

Furthermore, the reduced aperture of optics 146 in the rear scanning configuration is useful in increasing the depth of field, which may include objects very close to module 120. To increase the depth of field still further, rear surface 158 of mirror 138 may be masked, to decrease the light collection aperture still further. Alternatively or additionally, objective optics 146 may have different, adjustable focal positions for short- and long-range mapping.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for mapping, comprising:
   an illumination assembly, which is configured to project, via an exit pupil, a line of radiation extending in a first direction across a scene;
   a detection assembly, which is configured to receive the radiation reflected from the scene within a sensing area that contains at least a part of the line of the radiation, and which comprises a linear array of detector elements and objective optics, which focus the reflected radiation from the sensing area via an entrance pupil onto the linear array, wherein the line of the radiation and the sensing area have respective axes that are collinear in a plane containing the exit and entrance pupils;
   a scanning mirror, which is configured to scan the line of radiation and the sensing area together over the scene in a second direction, which is perpendicular to the first direction; and
   processing circuitry, which is configured to process signals output by the detector elements in response to the received radiation in order to construct a three-dimensional (3D) map of an object in the scene.

2. The apparatus according to claim 1, wherein the linear array has an array axis that is aligned along the first direction.

3. The apparatus according to claim 2, wherein the scanning mirror is configured to rotate about a mirror axis, and wherein the illumination assembly comprises at least one radiation source, which is arranged in a plane defined by the array axis and the mirror axis together with the linear array and the scanning mirror.

4. The apparatus according to claim 1, wherein the illumination assembly comprises a further linear array of radiation sources, which are configured to emit respective beams of radiation, and projection optics which are configured to collect and focus the emitted beams to form the line of the radiation.

5. The apparatus according to claim 4, wherein the radiation sources emit pulses of radiation in mutual synchronization.

6. The apparatus according to claim 1, wherein the scanning mirror is a second scanning mirror, while the illumination assembly comprises a radiation source, which is configured to emit a beam of radiation, and a first scanning mirror, which is configured to receive and scan the emitted beam in the first direction.

7. The apparatus according to claim 6, wherein the first scanning mirror scans at a first speed, and the second scanning mirror scans at a second speed, which is slower than the first speed.

8. The apparatus according to claim 1, wherein the illumination assembly is configured to emit pulses of radiation, and wherein the signals output by the detector elements are indicative of respective times of flight of the pulses from points in the scene, and the processing circuitry is configured to construct the 3D map responsively to the times of flight.

9. The apparatus according to claim 8, wherein the detector elements comprise avalanche photodiodes.

10. The apparatus according to claim 8, wherein the detector elements comprise single-photon avalanche diodes.

11. The apparatus according to claim 8, wherein the processing circuitry comprises a pulse amplifier, which is configured to amplify the signals output by the detector elements, and a multiplexer, which is configured to select the detector elements for connection to the pulse amplifier in synchronization with a scan rate of the apparatus.

12. The apparatus according to claim 1, wherein the scanning mirror is rotatable so as to scan the line of radiation and the sensing area both over a first scene on a first side of the apparatus and over a second scene on a second side of the apparatus, opposite the first side.

13. The apparatus according to claim 12, wherein the scanning mirror has first and second opposing reflective surfaces, and wherein the scanning mirror rotates so that the line of radiation and the sensing area reflect from the first reflective surface when scanning over the first scene and from the second reflective surface when scanning over the second scene.

14. The apparatus according to claim 12, wherein the second reflective surface is smaller than the first reflective surface.

15. A method for mapping, comprising:

projecting, via an exit pupil, a line of radiation that extends in a first direction over a scene;

receiving, via an entrance pupil, the radiation reflected from the scene within a sensing area of a detector assembly, which comprises a linear array of detector elements, wherein the sensing area contains at least a part of the line of the radiation, and wherein the line of the radiation and the sensing area have respective axes that are collinear in a plane containing the exit and entrance pupils;

scanning, using a scanning mirror, both the line of radiation and the sensing area over the scene in a second direction, which is perpendicular to the first direction; and processing signals output by the detector elements in response to the received radiation in order to construct a three-dimensional (3D) map of an object in the scene.

16. The method according to claim 15, wherein receiving the radiation comprises aligning an array axis of the linear array along the first direction.

17. The method according to claim 15, wherein projecting the line of radiation comprises applying a linear array of radiation sources to emit respective beams of radiation, and collecting and focusing the emitted beams to form the line of the radiation.

18. The apparatus according to claim 15, wherein projecting the line of radiation comprises scanning a beam along the line in the first direction.

19. The method according to claim 18, wherein scanning the beam comprises scanning the beam along the line at a first speed, and wherein scanning using the scanning mirror comprises scanning the line of radiation and the sensing area over the scene at a second speed, which is slower than the first speed.

20. The method according to claim 15, wherein scanning the line of radiation comprises scanning pulses of radiation, and wherein the signals output by the detector elements are indicative of respective times of flight of the pulses, and wherein processing the signals comprises constructing the 3D map responsively to the times of flight.

* * * * *